Figure 1:
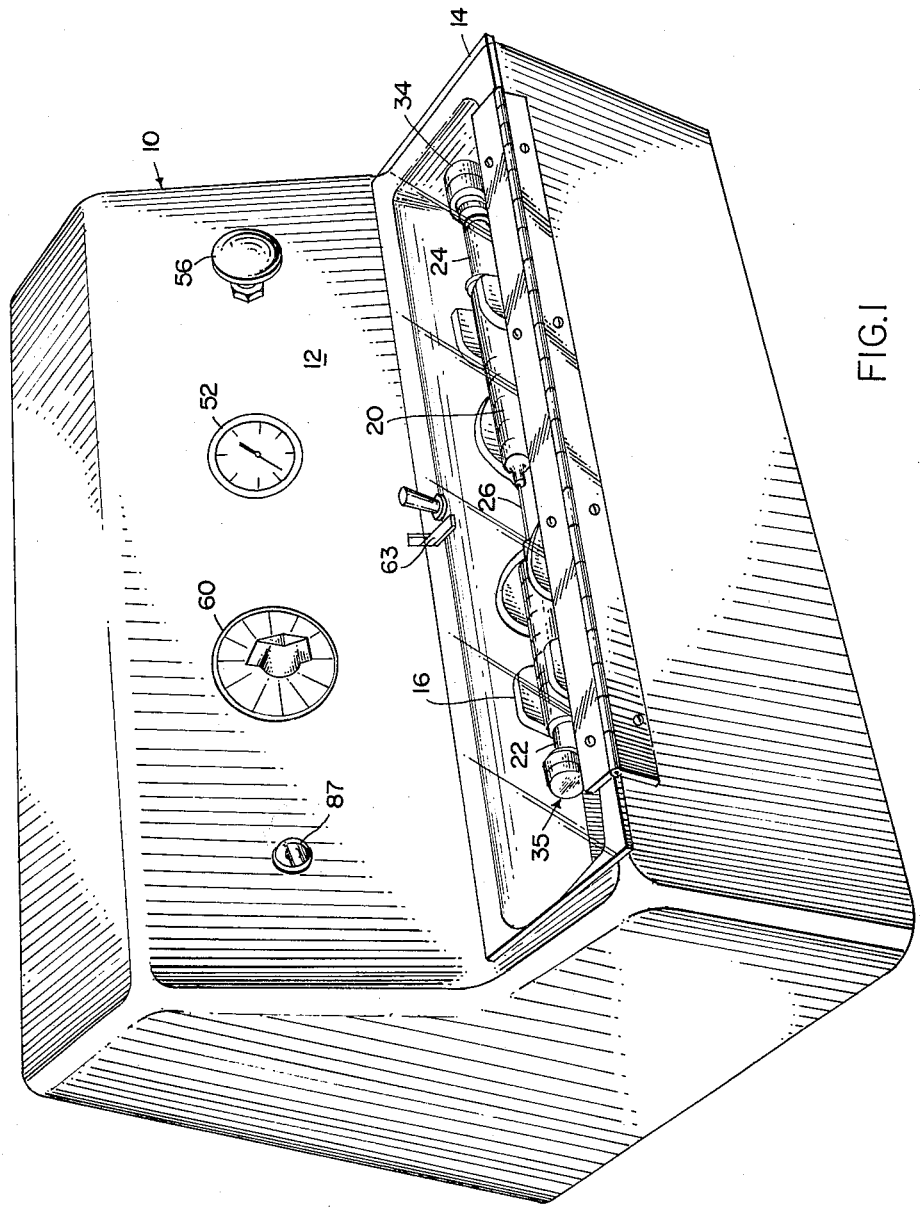

Jan. 1, 1963 E. A. BROWN ET AL 3,071,351
EMULSOR
Filed Oct. 25, 1960 3 Sheets-Sheet 1

INVENTORS
ETHAN A. BROWN
ARTHUR GELB
BY
Kenway, Jenney & Hildreth
ATTORNEYS

Jan. 1, 1963  E. A. BROWN ET AL  3,071,351
EMULSOR
Filed Oct. 25, 1960  3 Sheets-Sheet 2
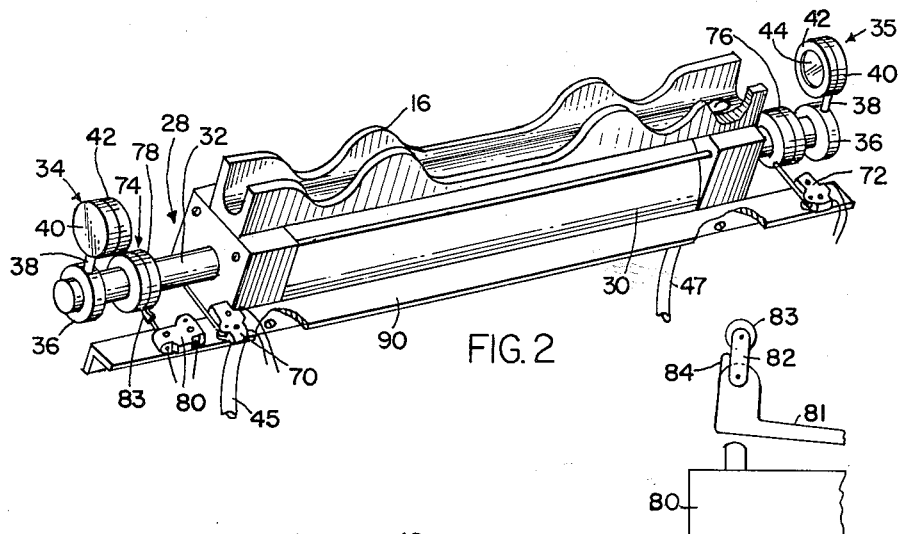
FIG. 2
FIG. 3
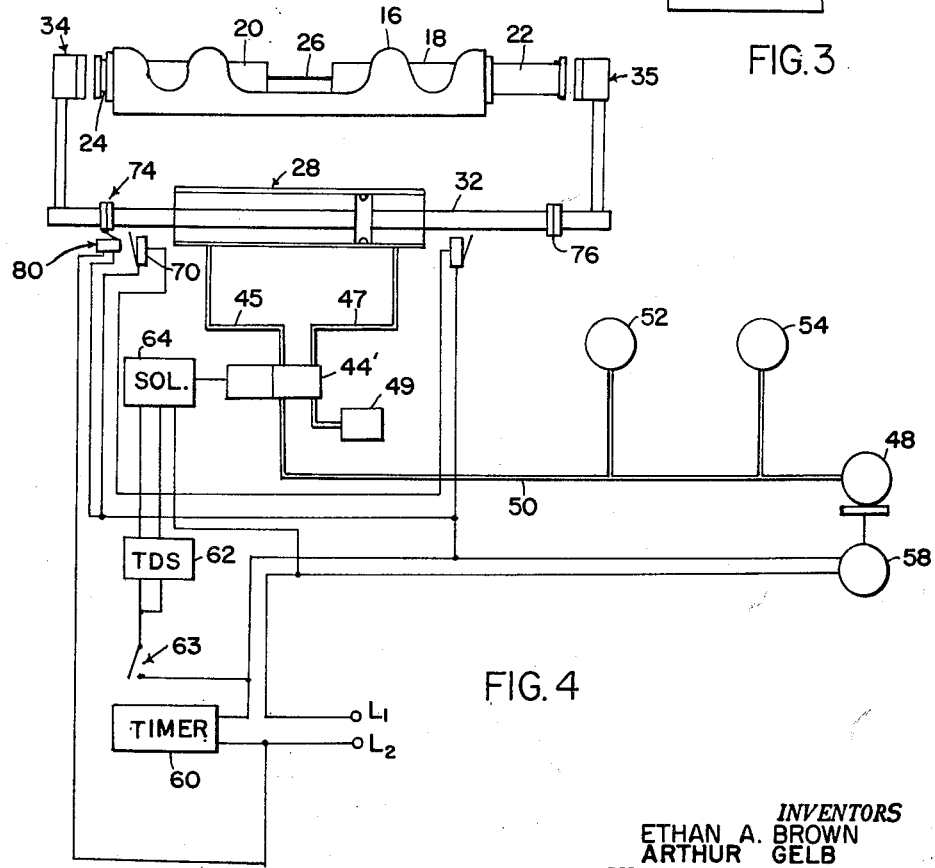
FIG. 4
INVENTORS
ETHAN A. BROWN
ARTHUR GELB
BY
Kenway, Jenney & Hildreth
ATTORNEYS

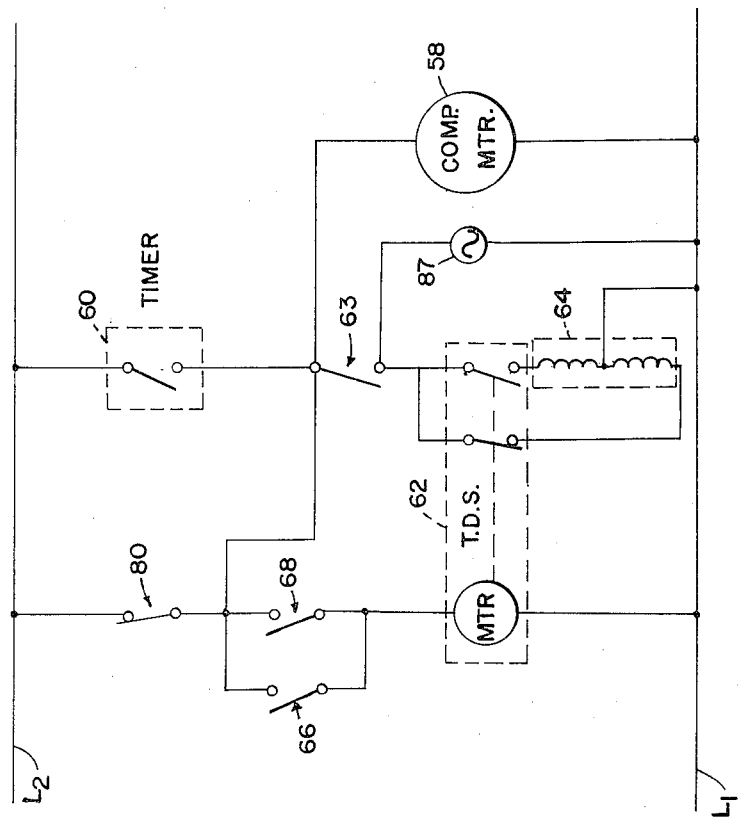

United States Patent Office 3,071,351
Patented Jan. 1, 1963

3,071,351
EMULSOR
Ethan A. Brown, 75 Bay State Road, Boston, Mass., and Arthur Gelb, Cambridge, Mass. (56 Thornberry Road, Winchester, Mass.)
Filed Oct. 25, 1960, Ser. No. 64,768
15 Claims. (Cl. 259—98)

This invention is concerned with the emulsifying of inoculants for use in injection treatment of allergies and for immunization. More particularly, this invention relates to an automatic emulsor which will provide medical quality emulsion of inoculants for the above-stated purposes.

The advantages and utility of medical emulsion-injection treatment for allergies and for immunization has made this form of treatment highly desirable in many instances. Heretofore, such emulsions have been prepared by forcing the inoculant to be emulsified from one hypodermic syringe to another through a double hubbed emulsator needle and then repeating the operation in the reverse direction. The entire cycle is repeated until the inoculant is thoroughly emulsified. In the past, this operation has been done manually in a doctor's office inasmuch as the emulsion must be administered very shortly after it is prepared. The entire operation may require cycling through an emulsator of a particular size, as much as 200 times followed by further cycling as much as 50–75 times using progressively smaller emulsator needles until the desired result is achieved. As will be apparent, such an operation requires considerable time on the part of the attendant or nurse performing the same, thus materially and undesirably increasing the costs of treatment. Also, considerable skill is required in obtaining an acceptable emulsion of medical quality. For example, one advantage of the use of an inoculant is that it can normally be administered in a considerably stronger dosage than the inoculant which has not been emulsified. However, in order to assure that no adverse affects result from the increased strength of the emulsified inoculant, it is essential that the inoculant be totally emulsified. Also, care must be taken to assure that the emulsifying operation is conducted for a sufficient time to insure that the droplet size of the inoculant is reduced to that desired, which may be as low as 0.1 to 0.2 micron. Further, it is, of course, essential that uniformity between batches of emulsions be obtained in order to assure reliability and predictability of results.

Accordingly, it is a primary object of this invention to provide a novel emulsor for use in providing medical quality emulsified inoculants, and which will provide such emulsions in a fully automatic manner, so as to eliminate the attendance of a skilled operator during the various portions of the emulsifying cycle.

It is a further object of this invention to provide such an automatic emulsor which will assure that the inoculant prepared thereby will be totally emulsified and which will assure that when the operation has been completed the droplet size of the inoculant will have been reduced to a predetermined size desired.

It is a further object of this invention to provide an emulsor of the type described whereby the mixing is accomplished in a closed system to prevent the possibility of contamination of the inoculant by foreign particles so as to provide completely aseptic results.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a perspective elevational view of an emulsor constructed in accordance with the present invention;

FIG. 2 is a rear perspective view of the syringe holder and syringe plunger actuating mechanism of the emulsor of FIG. 1;

FIG. 3 is an enlarged fragmentary elevational view of a portion of the syringe plunger actuating mechanism of FIG. 2;

FIG. 4 is a digrammatic representation of the operative elements of FIG. 2 together with the primary components of the control system therefor; and FIG. 5 is a schematic diagram of the electrical control system of the emulsor of FIG. 1.

With reference to the drawings, a specific embodiment of an emulsor constructed in accordance with the present invention comprises a housing or cabinet 10 having a sloping upper front wall 12 terminating at its lower end in a forwardly projecting portion on the cabinet which is provided with a well closed by a transparent hinged cover 14. Disposed within the well is a syringe holder or cradle 16 which is mounted in fixed relation relative to the housing or cabinet 10. The cradle 16 is constructed to clampingly engage a pair of liquid containing vessels 18 and 20, each having a fluid engageable member for exhausting fluid from the vessel. In the specific embodiment shown, these vessels are a pair of hypodermic syringes of conventional construction and having plungers 22 and 24, respectively, for exhausting fluid therefrom. The syringes are held by the cradle in aligned end-to-end orientation with the open ends of the syringes facing each other and connected by a double hubbed needle 26. It will, of course, be recognized that structures other than a double hubbed needle could be used to provide a suitable restricted passage or passages between the vessels 18 and 20. While the invention will be described in terms of a single pair of syringes, it will be apparent to those skilled in the art that the invention might also be adapted for use with a plurality of pairs of such syringes.

With particular reference to FIG. 2, the syringe holder 16 is rigidly mounted on the frame of a fluid motor, generally indicated at 28, which is disposed within the cabinet 10. The motor 28 is in turn rigidly mounted on the cabinet by suitable means, not shown. In the specific embodiment shown, the motor 28 is an air motor comprising a cylinder 30 and a piston rod 32 extending from the opposite ends of the cylinder 30. The piston rod 32 is connected to a piston, not shown, within the cylinder 30. The cylinder 30 is aligned with the longitudinal axis of the syringe holder 16 and thus, is in alignment with the axes of the syringes retained by the syringe holder. To provide a driving connection between the piston rod 32 and the plungers 22 and 24, a pair of pusher heads 34 and 35 are provided. Each of the pusher heads comprises a collar 36 slidably assembled over the ends of the piston rods and held in adjusted position longitudinally thereof by suitable means such as set screws. Each of the collars 36 is provided with a radially projecting arm 38 on the outer end of which is mounted a cylindrical body 40 provided with a cylindrical threaded portion extending toward the syringe holder 16 and in alignment therewith. A cap 42 is threadedly mounted on the body 40 of each pusher head for adjustment in a direction parallel to the path of movement of the piston rod 32. The caps 42 provide the driving engagement between the pusher heads and the plungers 22 and 24 of the syringes 18 and 20, respectively. In this connection, the ends of the caps 42 facing the plungers are provided with a resilient insert 44, in the form of a rubber disc or the like, which provides a resilient bumper between the pusher head and the plunger eliminating the need for resilient attachments on the ends of the plungers.

With reference to FIGS. 2 and 4, the operation of the air motor 28 is controlled by a four-way valve 44' having an input port connected to a compressor 48 by a conduit 50. While for the purposes of simplicity of disclosure, the control valve means is described as a four-way valve of the spool type, it may be preferred to use a poppet valve structure so as to obviate the necessity of lubricating the air supplied to the valve in order to lubricate the valve. As shown in FIG. 4, a pressure gauge 52 and a manually-adjustable pressure regulator 54 are also connected to the conduit 50. As shown in FIG. 1, the gauge 52 is mounted on the sloping front wall 12 of the cabinet 10 and an adjusting knob 56 for the pressure regulator 54 is also mounted on the front wall 12 of the cabinet. The air compressor 48 is driven by an electric motor 58 which is connected through a suitable timer 60 to input power lines $L_1$ and $L_2$. The timer of the specific embodiment is a conventional clock works driven timer having a normally open switch which is closed when the timer is set to the desired time period and which will be opened at the termination of the pre-set time interval. The four-way valve 44' is further provided with a pair of outlet ports connected, respectively, by conduits 45 and 47 to the opposite ends of the air cylinder 30 on the opposite sides of the piston therein. The valve 44' is provided with a further outlet port connected to a muffler 49 to provide for attenuation of the noises attendant to the exhaust of compressed air from the valve 44'.

The timer 60 is also connected to suitable time delay switching means 62 through a normally open switch 63 mounted on the cabinet 10. The switch 63, as shown in FIG. 1, is actuated by the cover 14 to close the switch when the cover is closed. The time delay switching means 62 is also connected to a solenoid 64 for controlling the position of the four-way valve 44'. In the specific embodiment shown, the solenoid 64 is of a type which is energizable to place it in one condition to shift the spool of the four-way valve in one direction from center and is also energizable to place it in another condition to shift the spool of the four-way valve in the opposite direction from center. When the solenoid is deenergized, the four-way valve will be centered and no air will be admitted to or exhausted from the air motor.

Also connected to the time delay switching means 62 are a pair of normally open limit switches 66 and 68 having movable switch arms 70 and 72, respectively. The movable switch arms 70 and 72 are engageable by cams 74 and 76, respectively, mounted on the piston rod 32. In the specific embodiment shown, the cams 74 and 76 each comprise a pair of collars 78 slidably assembled onto the piston rod 32 and engaged in end-to-end abutment. The collars are fixed to the piston rod 32 in adjusted position along the rod by suitable means such as set screws. Also connected to the timer means 60 is a normally closed flag switch 80. As shown in FIG. 3, in the specific embodiment, the switch 80 is provided with a contact arm 81 which is movable generally at right angles to the axis of the piston rod 32. On the end of the movable contact arm is a second arm 82 pivotally mounted at one end to the contact arm 80 and at its other end carrying a roller 83. The roller carrying arm 82 is biased in a counterclockwise direction as viewed in FIGS. 2 and 3, and a stop 84 is provided to limit movement of the arm 82 in a counterclockwise direction to a position where it is generally in alignment with the movable contact arm 81. As the piston movement of the movable contact arm 81. As the piston rod 32 moves to the right as viewed in FIG. 2, the cam 74 will engage the roller 83 and cause the pivoted arm 82 to be moved in a clockwise direction without causing an actuation of the switch 80. On the other hand, when the piston rod 32 is moving to the left, the engagement of the cam 74 with the roller 83 will cam the arm 82, and thus the arm 81, toward the switch 80 to open the same.

With reference to FIG. 2, it can be seen that the switches 70, 72 and 80 are mounted on a rigid bracket 90 which is securely and rigidly fastened to the frame of the air motor 28. With both the bracket 90 and the syringe holder 16 being rigidly mounted to the air motor, it can be seen that the maintenance of accurate alignment of these various component parts for accurate programming of the operation of the air motor is assured.

The operation of the emulsor will now be described with particular reference to FIG. 5 of the drawings. A measured amount of the inoculant is first drawn into one of the syringes 18 and 20. A double hubbed needle of the desired gauge is then placed on the syringe and connected to the other syringe of the pair. The syringes and emulsator needle are then placed in the syringe holder 16. The length of the syringe holder is less than the minimum total length of the syringe-needle combination for which the emulsor is adapted for use, in order to facilitate removal and installation of the syringes. The syringe-needle combination is centered in the syringe holder, and the cover 14 is then closed. The closing of the cover will close the normally open switch 63 which provides an interlock in the control mechanism of the emulsor to assure that the emulsor will not be operable unless the cover 14 is closed.

As shown in FIG. 5, the setting of the timer 60 to the desired time cycle will, through the closing of the normally open switch in the timer, effect energizing of the motor 58 to begin operation of the compressor 48. When the cover interlock switch 63 is closed, the closing of the timer contacts will be visibly indicated by the indicating light 87 which, as shown in FIG. 1, is mounted on the front wall 12 of the cabinet. The cover interlock switch is also connected through the time delay switching means 62 to the solenoid 64. The time delay switching means of the specific embodiment shown includes a motor drivingly connected to a pair of switches which are alternately open and closed by the motor. One of the switches of the time delay means 62 is always closed so that when the timer switch and interlock switch 60 are closed, the solenoid will be energized to shift the control valve for the air motor to a position corresponding to rightward or leftward movement of the piston rod 32 depending on the position of the control valve 44'. It will be assumed that the control valve 44' is in position to cause the piston rod 32 to move to the left. Accordingly, the pusher head 35 will engage the end of the plunger 22 of the syringe 18, which it will be assumed has been initially partially filled with inoculant to be emulsified. During movement of the piston rod 32 to the left, the cam 76 will engage the contact arm 72 of the limit switch 68 to close the contacts of this switch. As shown in FIG. 5, the closing of the switch 68 will in turn energize the motor of the time delay switching means 62 so that after a predetermined time delay, the closed switch of the time delay means will be opened and the previously open switch will be closed. The energizing of the solenoid 64 will thus be reversed to shift the valve 44' and cause reversal of the direction of the movement of the piston rod 32.

In the specific embodiment shown, the contact arm 72 is sufficiently resiliently flexible to permit continued flexing thereof by the cam 76 after actuation of the switch 68 and during the time delay interval determined by the time delay switching means 62. This over travel of the piston rod is desired to assure that there will be complete exhausting of the fluid within the syringe 18 prior to reversing of the direction of movement of the piston rod. In the specific embodiment shown, the time delay between the actuation of the switch 68 and reversal of movement of the piston rod is approximately six seconds. During this time delay the plunger 22 will bottom in the syringe 18 and will remain bottomed therein for a certain portion of the time delay period. One of the advantages of the constant force driving of the plungers of the syringes obtained by the use of the fluid motor drive is that even though the plungers may be bottomed in the syringes, the force exerted by the plunger on the syringe will not exceed the normal operating force, thus assuring that the syringes will not be broken. In the specific embodiment shown, the pressure regulator 54 is preferably set to adjust the pressure within the air motor to approximately 20 p.s.i. as indicated on the pressure gauge 52.

After reversal of movement of the piston rod 32 the piston rod will travel to the right whereupon the pusher head 34 will engage the plunger 24 causing it to move to the right, as viewed in FIGS. 2 and 4, to exhaust the fluid from the syringe 20 through the emulsator 26 and back into the syringe 18. The piston rod 32 will continue to move to the right until the cam 74 engages the movable contacts arm 70 of the limit switch 66 to close this switch which, as shown in FIG. 5, is connected in parallel with the limit switch 68. The actuation of the limit switch 66 will thus energize the motor of the time delay switching means 62 in the manner previously described, and after a predetermined time interval, the solenoid 64 will be energized to shift the valve 44' and reverse piston rod movement to the left. This cycle of operations will be repeated until the end of the time set on the timer 60 whereupon the timer switch will again be opened. However, in accordance with the invention, the operation of the emulsor will not be stopped until opening of the flag switch 80 which, as shown in FIG. 5, is connected across the switch of the timer 60. As previously described, the flag switch 80 will be actuated by the cam 74 only during movement of the piston rod to the left as viewed in FIGS. 2 and 4. Therefore, if at the end of the time set on the timer 60 the piston rod 32 is moving to the right as viewed in FIG. 3, such movement will continue until piston rod movement has been reversed by reason of actuation of the limit switch 66 by the cam 74. On subsequent movement of the piston rod to the left, the cam 74 will open the switch 80 to cause deenergizing of the drive motor 58 thus halting the operation of the device.

The purpose of the over-ride switch 80 is to provide for a backing off of the pressure heads from the plungers at the end of the cycle in order to facilitate removal of the syringes from the device and further to facilitate installation of syringes for subsequent operations. In this connection, the position of the piston rod 32, shown in FIG. 4, is the position of the rod either at the end of a cycle or at the beginning of a cycle. In this condition of the emulsor, it will be noted that both pusher heads are spaced from the ends of the plungers 22 and 24 and that the plunger 24 is bottomed in the empty syringe 20 while the plunger 22 is spaced from the bottom of the plunger 18 by an amount determined by the amount of inoculant drawn into the syringe. Accordingly, it will be apparent that the pusher heads are spaced apart a predetermined distance which is substantially greater than the overall length of the syringe emulsator combination as measured when the plunger of one syringe is bottomed and the plunger of the other syringe is withdrawn in an amount equal to the maximum quantity of the fluid to be handled by the syringe. In the specific embodiment of the invention shown, the total spacing of the pusher heads and plungers is aproximately one inch. From the above, it should be further apparent that the stroke of the piston rod 32 exceeds the total maximum stroke of the syringe plungers by an amount equal to the maximum total spacing of the plungers and pusher heads. The switch 80 is located relative to the cam 74 when the piston rod 32 is in its rightward limit of travel so that upon subsequent leftward movement of the piston rod, the cam 74 will actuate the switch 80 after approximately ¼-inch travel, or in other words, after travelling a distance less than the total spacing of the pusher heads and plungers of the syringes. Thus, it will be seen that as the piston rod is moving to the right with the pusher head 34 engaged with the plunger 22 the pusher head 35 will be spaced from the plunger 22 a distance of approximately one inch. If the timer 60 has run out so as to determine the end of operation of the emulsor, then upon reversal of movement of the piston rod, and after approximately ¼-inch travel thereof, the switch 80 will be actuated to halt operation of the device whereupon the pusher head 35 will then be spaced approximately ¾-inch from the plunger 22 and the pusher head 34 will be spaced approximately ¼-inch from the plunger 24.

During the operation of the emulsor the opening of the cover 14 will, of course, automatically cause fluid transfer between the syringes to be stopped. Closing the lid securely will allow resumption of normal operation. If it is desired to remove the syringes during a timed cycle, the timer 60 should be set back to the zero setting whereupon after actuation of the switch 80, the cycle will be stopped and the pusher heads will have been backed off from the syringes so that they may be removed. Upon completion of the emulsifying operation the syringe pair are removed from the emulsor and the prepared emulsion placed into suitable receptacles or into other syringes for administration of the emulsion. The time of operation of the emulsor will vary with the amount of inoculant being emulsified and with the size of the emulsator needle. For example, a normal processing run for 8 cc. of emulsion might comprise operation with an 18 gauge emulsator needle for thirty minutes followed by operation with a 22 gauge emulsator needle for fifteen minutes and finally operation with a 25 gauge emulsator needle for fifteen minutes. In the specific embodiment shown, the fluid may be transfered through the emulsator passage approximately seven times per minute using the 18 gauge emulsator needle while only once per minute using the 25 gauge emulsator needle.

It can thus be seen that there has been provided a novel and improved device for automatically providing emulsions of medical quality. The requirement that the fluid in one syringe be totally exhausted from the syringe during transfer of the fluid from that syringe of the other of the pair is fully met in the emulsor of this invention by reason of the over travel of the pusher heads permitted subsequent to the actuation of the limit switches so as to assure bottoming of the plungers in the syringes. The use of the constant force drive as provided by the air motor assures that even though a plunger of a syringe is bottomed therein, the syringe will not be broken. Further, the constant force applied to the plungers provides a constant force on the fluid being transferred so that over a predetermined time interval a predictable result can be obtained. The time of passage of the fluid from one syringe to the other is determined entirely by the time required for the piston of the air motor to travel sufficiently to bottom the plunger in its syringe and is not determined by any separate timing devices. This, of course, assures complete exhaustion of the fluid during each cycle from each syringe while at the same time provides for minimum time between reversals of direction of operation of the piston rod.

It will be apparent to those skilled in the art that many and varied changes and modifications could be made in the emulsor herein described and shown in the accompanying drawings. For example, other constant force motive means could be provided for the pusher heads and other suitable time delay switching means could be utilized. Further, if desired, pressurized fluid for the fluid motor could be provided from an external source. Also, it will be apparent that while the emulsor of this invention has particular utility and has been specifically described in connection with the preparation of medical emulsions, this invention may also be useful in the preparation of emulsions of materials other than medical inoculants.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. An automatic emulsor for transferring liquid from one vessel to another of a pair thereof through a restricted passage comprising a pair of such vessels of a type each having a movable fluid engageable member for exhausting liquid therefrom, and drive means for alternately driving the fluid engageable members of such a pair of vessels to drive one fluid engageable member in a direction to exhaust the contents of its vessel into the other vessel and sequentially to drive the other fluid engageable member in a direction to exhaust the contents of its vessel, said drive means including a driving member movable in opposite directions, and control means for effecting reversal of movement of said driving member after the fluid engageable member currently driven by said driving member has exhausted the liquid from the respectively associated vessel.

2. An automatic emulsor for transferring liquid from one vessel to another of a pair thereof through a restricted passage comprising a pair of such vessels of a type each having a movable fluid engageable member for exhausting liquid therefrom, drive means for alternately driving the fluid engageable members of a pair of such vessels to exhaust liquid from one vessel into the other and then vice versa, the drive means including constant force motive means having a driving member alternately movable in opposite directions, means for drivingly connecting the driving member and a pair of such fluid engageable members, and control means connected to said motive means for automatically effecting reversal of movement of said driving member after the fluid engageable member driven by said driving member has exhausted the liquid from the respectively associated vessel.

3. An automatic emulsor for transferring liquid from one vessel to another of a pair thereof through a restricted passage comprising a pair of such vessels of a type each having a movable fluid engageable member for exhausting liquid therefrom, and drive means alternately engageable with the fluid engageable members of the pair of such vessels for alternately driving the same to exhaust from one vessel into the other and then vice versa, the drive means including means for automatically effecting disengagement thereof from one fluid engageable member and engagement with the other fluid engageable member of the pair of vessels subsequent to exhausting of the vessel associated with said one fluid engageable member.

4. An automatic emulsor for transferring liquid from one vessel to another of a pair thereof through a restricted passage comprising a pair of such vessels of a type each having a movable fluid engageable member for exhausting liquid therefrom, reversible drive means drivingly engageable with the fluid engageable members of such a pair of vessels, means for automatically reversing said drive means including control means responsive to the position of the fluid engageable member currently driven by said drive means, and time delay means operably connected to said control means and said drive means to provide for reversal of said drive means a predetermined time interval after actuation of said control means.

5. An emulsor, comprising a pair of syringes, a restricted passage connecting said syringes, each syringe having a plunger for exhausting liquid therefrom, reversible drive means for exerting a predetermined maximum drive force on said plungers alternately so as to exhaust the liquid from one syringe into the other and then vice versa, and means to effect reversal of said drive means subsequent to bottoming of the currently driven plunger in the syringe.

6. An emulsor, comprising a pair of syringes, a restricted passage connecting said syringes, each syringe having a plunger for exhausting liquid therefrom, a reversible drive motor, means for connecting the drive motor to the plunger of such a pair of syringes for the driving of one plunger during operation of the drive means in one direction and for driving of the other plunger during operation of the drive motor in the reverse direction, and control means for effecting reversal of the drive motor, said control means being initially responsive to the position of the plunger currently driven by the drive motor and being operative to effect reversal of said drive motor a predetermined time delay interval after initial actuation of said control means.

7. An emulsor, comprising a pair of syringes, a restricted passage connecting said syringes, each syringe having a plunger for bottoming in the syringe to completely exhaust liquid therefrom, a reversible constant force drive motor, means for connecting the drive motor to the plunger of such a pair of syringes for the driving of one plunger during operation of the drive motor in one direction and for driving of the other plunger during operation of the drive motor in the reverse direction, and control means connected to the drive motor for effecting reversal of the same, said control means being operable to reverse the drive motor subsequent to bottoming of the currently driven plunger in its syringe so as to assure complete exhausting of the vessels.

8. An emulsor, comprisinng a pair of vessels, a restricted passage connecting said vessels, each vessel having a plunger for exhausting liquid therefrom, reversible drive means for alternately drivingly engaging the plungers of such a pair of vessels, said drive means including a pair of plunger engageable pusher heads mounted for simultaneous movement first in one direction and then in a reverse direction, the pusher heads being spaced apart a distance sufficient to provide that during driving of one plunger by one pusher head the other pusher head will be spaced from the other plunger by a predetermined amount, means to effect automatic reversal of said drive means, and means to render said drive means inoperative subsequent to a reversal thereof and prior to movement of the pusher heads in the reverse direction an amount equal to said predetermined amount.

9. An emulsor, comprising a pair of vessels, a restricted passage connecting said vessels, each vessel having a plunger for exhausting liquid therefrom, reversible drive means for alternately drivingly engaging the plungers of such a pair of vessels, said drive means including a pair of plunger engageable pusher heads mounted for simultaneous movement first in one direction and then in a reverse direction, the pusher heads being spaced apart a distance sufficient to provide that during driving of one plunger by one pusher head the other pusher head will be spaced a predetermined distance from the other plunger, means to effect automatic reversal of said drive means, time responsive means for determining the end of a cycle of operation of the drive means, and overriding control means responsive to pusher head position for preventing the halting of operation of said drive means by the time responsive means, said time responsive means and overriding control means being cooperable to render the drive means inoperative following the elapse of a predetermined time interval and subsequent to a reversal of said drive means.

10. An emulsor, comprising a pair of vessels for containing liquids, means mounting a pair of such vessels, each vessel having a plunger for exhausting liquid therefrom, an emulsator passage connecting said vessels, a reversible fluid motor for driving the plungers of such a pair of vessels alternately in opposite directions, fluid flow control valve means connected to said motor, and control means to operate said control valve means to effect reversal of said motor subsequent to exhausting of fluid from the vessel the plunger of which is currently driven and including means for providing a predetermined time delay between initial actuation of said control means and the actuation of said valve means to effect reversal of said drive motor.

11. An emulsor, comprising a pair of vessels for containing liquids, means mounting a pair of such vessels, each vessel having a plunger for bottoming in the vessel to completely exhaust liquid therefrom, an emulsator passage connecting said vessels, a reversible fluid motor for driving the plungers of such a pair of vessels alternately in opposite directions, fluid flow control valve means connected to said motor for operating and reversing the same, means for connecting said valve means to a source of pressurized fluid, a pressure regulator for maintaining the fluid pressure to said valve means constant, and control means for operating said valve means to effect operation of said air motor and control reversing thereof in timed relation to the exhausting of fluid from a vessel the plunger of which is being driven by the fluid motor, said control means for delaying operation of said valve means to reverse the motor until subsequent to the bottoming of a driven plunger in its vessel.

12. An emulsor, comprising a pair of vessels for containing liquids, means mounting a pair of such vessels, each vessel having a plunger for exhausting liquid therefrom, an emulsator passage connecting said vessels, a reversible fluid motor having a reciprocable drive member, means for drivingly engaging the drive member and the plungers of such a pair of vessels to drive the plungers alternately in opposite directions, solenoid actuated fluid flow control valve means connected to said motor for reversal of the same, switch means for energizing said solenoid actuated valve means to provide for reversal of said motor said switch means including time delay means providing a predetermined time delay between initial actuation of said switch means and energizing of the valve means to reverse said motor and means on said drive member for initially actuating said switch means.

13. An emulsor for preparing medical quality emulsions comprising, a syringe holder for mounting a pair of syringes having plungers and being connected by a restricted passage, a reversible fluid drive motor mounted integrally with the syringe holder, means for drivingly connecting the fluid motor alternately to the plunger of one and then the other of said pair of syringes, and means to effect reversal of said fluid motor subsequent to bottoming of the currently driven plunger in its syringe including limit switch means mounted integrally with said syringe holder.

14. An emulsor for preparing medical quality emulsions, comprising a syringe holder for mounting a pair of syringes connected by a restricted passage, a reversible fluid drive motor having a reciprocable piston rod, a pair of syringe plunger engageable pusher heads mounted for movement with said piston rod and spaced apart in the direction of movement of the piston rod, and means for controlling operation and reversal of said fluid motor including switch means responsive to movement of the piston rod a predetermined distance in either direction from a center position thereof, time delay switching means operated by said switch means, and control valve means connected to said fluid motor and operated by said time delay switching means.

15. An emulsor for preparing medical quality emulsions, comprising a syringe holder for mounting a pair of syringes in end-to-end alignment with the plungers of the syringes on the outer ends of the pair and with the open ends of the syringes connected by a restricted passage, a fluid motor having a reciprocable piston rod extending in alignment with the syringe holder, a pair of plunger engageable pusher heads mounted for movement with said piston rod and spaced apart in the direction of movement of the piston rod a predetermined distance greater than the normal total length of a pair of syringes of a size used with the emulsor when the syringes are connected by an emulsator needle and the plunger of one syringe is bottomed therein while the plunger of the other syringe is withdrawn an amount corresponding to the capacity of the syringe, means for reversing the drive motor subsequent to bottoming of a driven plunger in its syringe, and means for controlling the duration of operation of the emulsor including means for rendering the drive motor inoperative only subsequent to a reversal thereof and prior to movement of the piston rod a distance equal to the difference between the pusher head spacing and said total length of the syringes.

References Cited in the file of this patent

UNITED STATES PATENTS

| 2,529,777 | McInnis | Nov. 14, 1950 |
| 2,566,811 | Stevenson | Sept. 4, 1951 |

FOREIGN PATENTS

| 414,957 | Great Britain | Aug. 16, 1934 |